(12) United States Patent  
Thomas et al.

(10) Patent No.: US 11,722,395 B2
(45) Date of Patent: *Aug. 8, 2023

(54) INTER-AUTONOMOUS SYSTEM TRACE ROUTE MESSAGE

(71) Applicant: Juniper Networks, Inc., Sunnyvale, CA (US)

(72) Inventors: Reji Thomas, Bangalore (IN); Ronald Bonica, Sterling, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/452,853

(22) Filed: Oct. 29, 2021

(65) Prior Publication Data

US 2022/0045928 A1 Feb. 10, 2022

Related U.S. Application Data

(63) Continuation of application No. 16/585,294, filed on Sep. 27, 2019, now Pat. No. 11,165,681.

(51) Int. Cl.
*H04L 45/741* (2022.01)
*H04L 43/10* (2022.01)
*H04L 43/0811* (2022.01)
*H04L 45/745* (2022.01)

(52) U.S. Cl.
CPC .......... *H04L 43/10* (2013.01); *H04L 43/0811* (2013.01); *H04L 45/741* (2013.01); *H04L 45/745* (2013.01)

(58) Field of Classification Search
None
See application file for complete search history.

(56) References Cited

U.S. PATENT DOCUMENTS

| 7,924,730 | B1 | 4/2011 | McAllister et al. |
| 10,374,938 | B1 | 8/2019 | Morris |
| 11,165,681 | B2 | 11/2021 | Thomas et al. |
| 2006/0198321 | A1 | 9/2006 | Nadeau et al. |
| 2012/0069740 | A1 | 3/2012 | Lu et al. |
| 2013/0128751 | A1 | 5/2013 | Keesara et al. |
| 2015/0029837 | A1* | 1/2015 | Ashwood-Smith ......... H04L 43/0811 370/242 |
| 2015/0207728 | A1 | 7/2015 | Gagliano et al. |
| 2017/0359260 | A1* | 12/2017 | Wood ................. H04L 45/7453 |
| 2017/0373966 | A1 | 12/2017 | Liao et al. |
| 2018/0077051 | A1 | 3/2018 | Nainar et al. |

(Continued)

OTHER PUBLICATIONS

Extended European Search Report for Application No. EP19211751.3, dated May 15, 2020, 9 pages.

*Primary Examiner* — Ajit Patel
(74) *Attorney, Agent, or Firm* — Harrity & Harrity, LLP

(57) ABSTRACT

A network device may receive a message. The network device may determine that the message includes return information indicating a path to an initial device that generated the message. The network device may modify the message by adding an upstream device identifier, wherein the upstream device identifier identifies a device from which the message is received. The network device may modify the message by adding an indication of whether the initial device is reachable by the network device using a segment identifier. The network device may provide the modified message to a downstream device.

20 Claims, 12 Drawing Sheets

(56) References Cited

U.S. PATENT DOCUMENTS

| | | |
|---|---|---|
| 2018/0077052 A1* | 3/2018 | Moiseenko ............. H04L 65/80 |
| 2018/0131532 A1* | 5/2018 | Wijnands ............ H04L 12/1886 |
| 2018/0287940 A1 | 10/2018 | Westphal |
| 2018/0316520 A1* | 11/2018 | Wijnands ................ H04L 45/50 |
| 2018/0375763 A1 | 12/2018 | Brissette et al. |
| 2020/0014557 A1 | 1/2020 | Wang et al. |
| 2020/0099610 A1 | 3/2020 | Heron et al. |
| 2021/0092053 A1* | 3/2021 | Filsfils ................... H04L 69/22 |

* cited by examiner

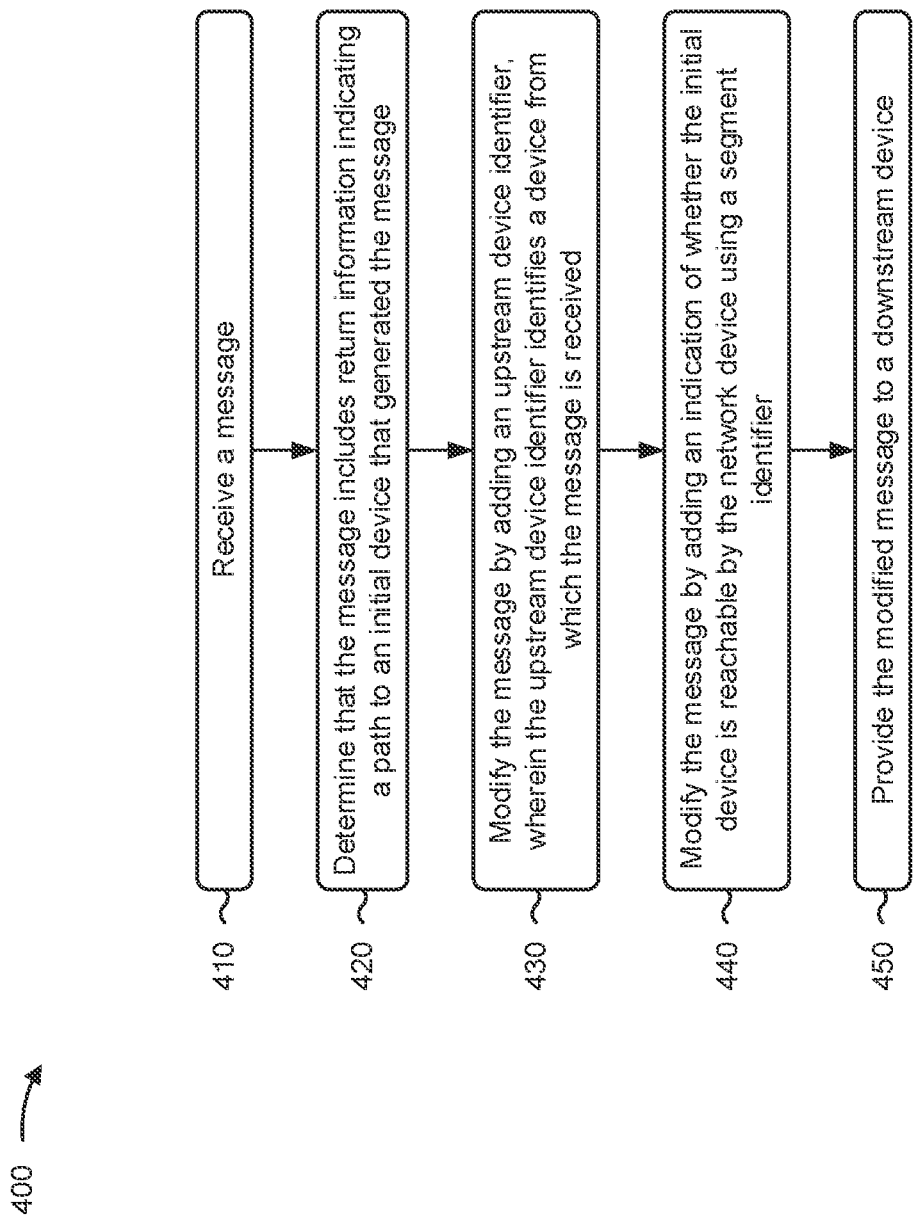

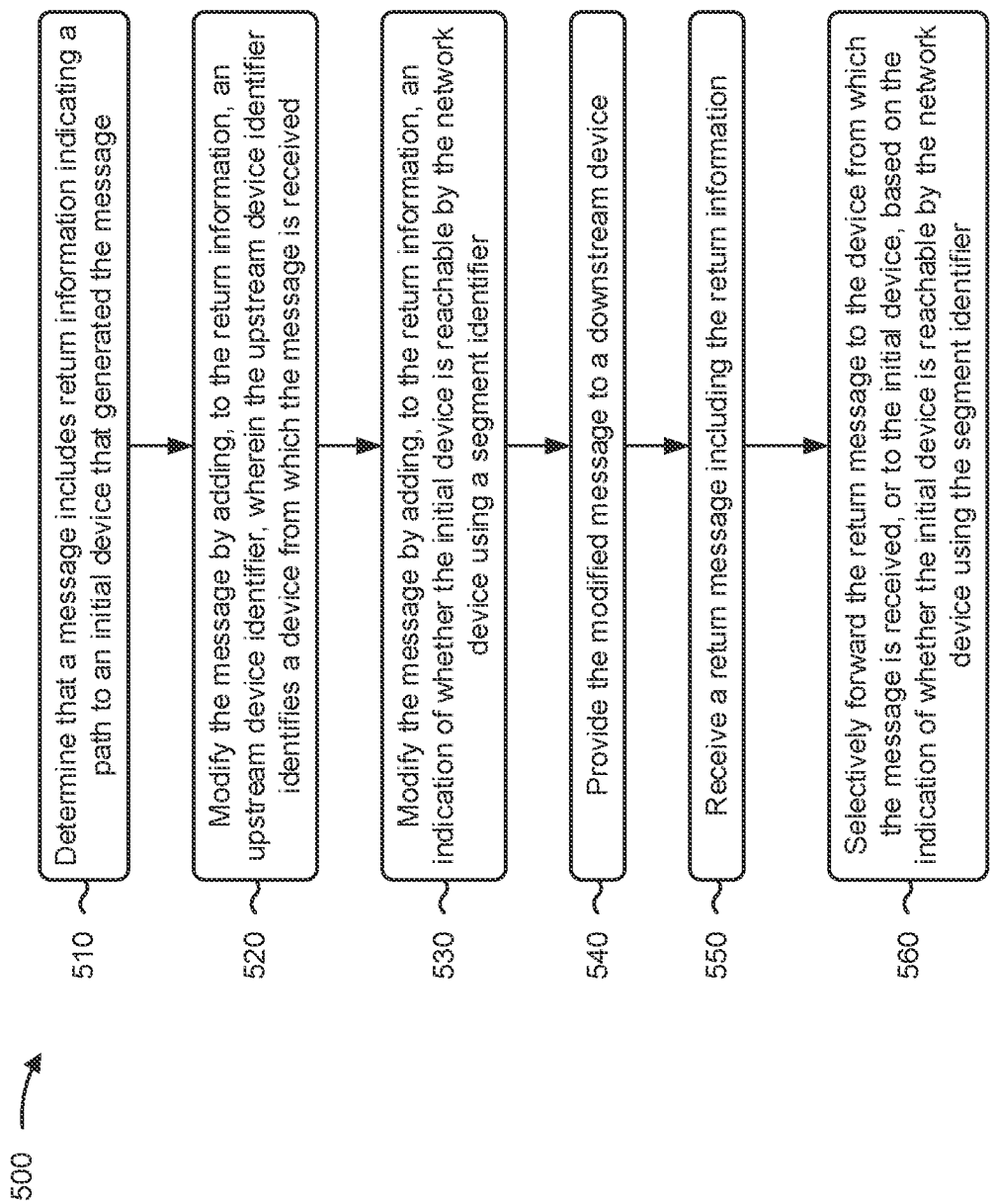

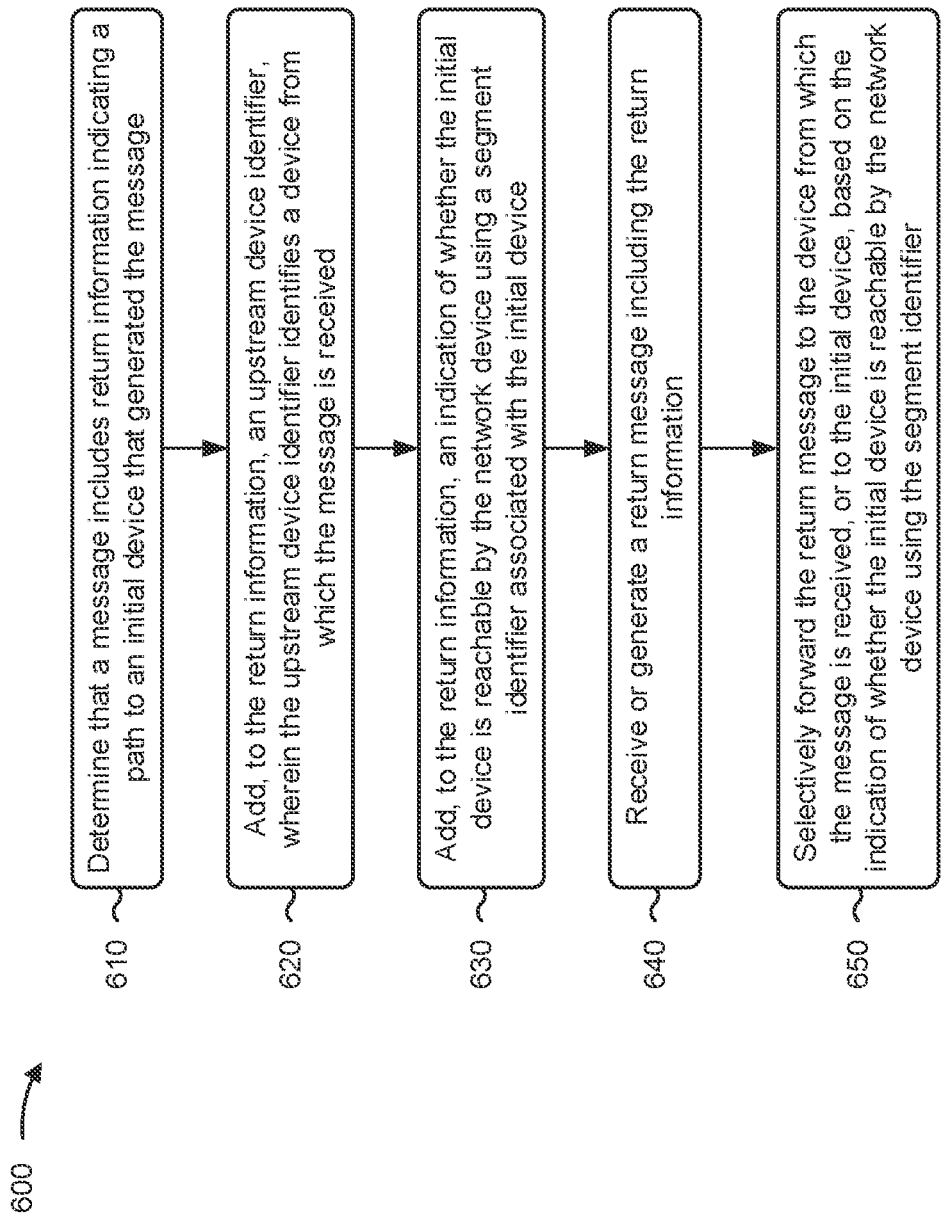

INTER-AUTONOMOUS SYSTEM TRACE ROUTE MESSAGE

RELATED APPLICATION

This application is a continuation of U.S. patent application Ser. No. 16/585,294, filed Sep. 27, 2019 (now U.S. Pat. No. 11,165,681), which is incorporated herein by reference in its entirety.

BACKGROUND

A wide variety of user devices (e.g., smartphones, tablets, and/or the like) connect to service provider networks to access resources and services provided by packet-based data networks, such as the Internet, enterprise intranets, content providers, virtual private networks (VPNs), and/or the like. Each service provider network typically provides an extensive network infrastructure to provide packet-based data services to the user devices. Each service provider network may include a wide area network (WAN), such as a single autonomous system (AS) within a WAN that includes multiple autonomous systems, two or more ASs within the WAN, and/or the like.

SUMMARY

According to some implementations, a method may include receiving, by a network device, a message; determining, by the network device, that the message includes return information indicating a path to an initial device that generated the message; modifying the message by adding, by the network device to the return information, an upstream device identifier, wherein the upstream device identifier identifies a device from which the message is received; modifying the message by adding, by the network device to the return information, an indication of whether the initial device is reachable by the network device using a segment identifier; and providing, by the network device, the modified message to a downstream device.

According to some implementations, a network device may include one or more memories; and one or more processors, communicatively coupled to the one or more memories, configured to: determine that a message includes return information indicating a path to an initial device that generated the message; modify the message by adding, to the return information, an upstream device identifier, wherein the upstream device identifier identifies a device from which the message is received; modify the message by adding, to the return information, an indication of whether the initial device is reachable by the network device using a segment identifier; provide the modified message to a downstream device; receive a return message including the return information; and selectively forward the return message to the device from which the message is received, or to the initial device, based on the indication of whether the initial device is reachable by the network device using the segment identifier.

According to some implementations, a non-transitory computer-readable medium may store one or more instructions. The one or more instructions, when executed by one or more processors of a network device, may cause the one or more processors to: determine that a message includes return information indicating a path to an initial device that generated the message; add, to the return information, an upstream device identifier, wherein the upstream device identifier identifies a device from which the message is received; add, to the return information, an indication of whether the initial device is reachable by the network device using a segment identifier associated with the initial device; receive or generate a return message including the return information; and selectively forward the return message to the device from which the message is received, or to the initial device, based on the indication of whether the initial device is reachable by the network device using the segment identifier.

BRIEF DESCRIPTION OF THE DRAWINGS

FIGS. 4-6 are flowcharts of example processes for trace route messaging.

DETAILED DESCRIPTION

Figure 1A:
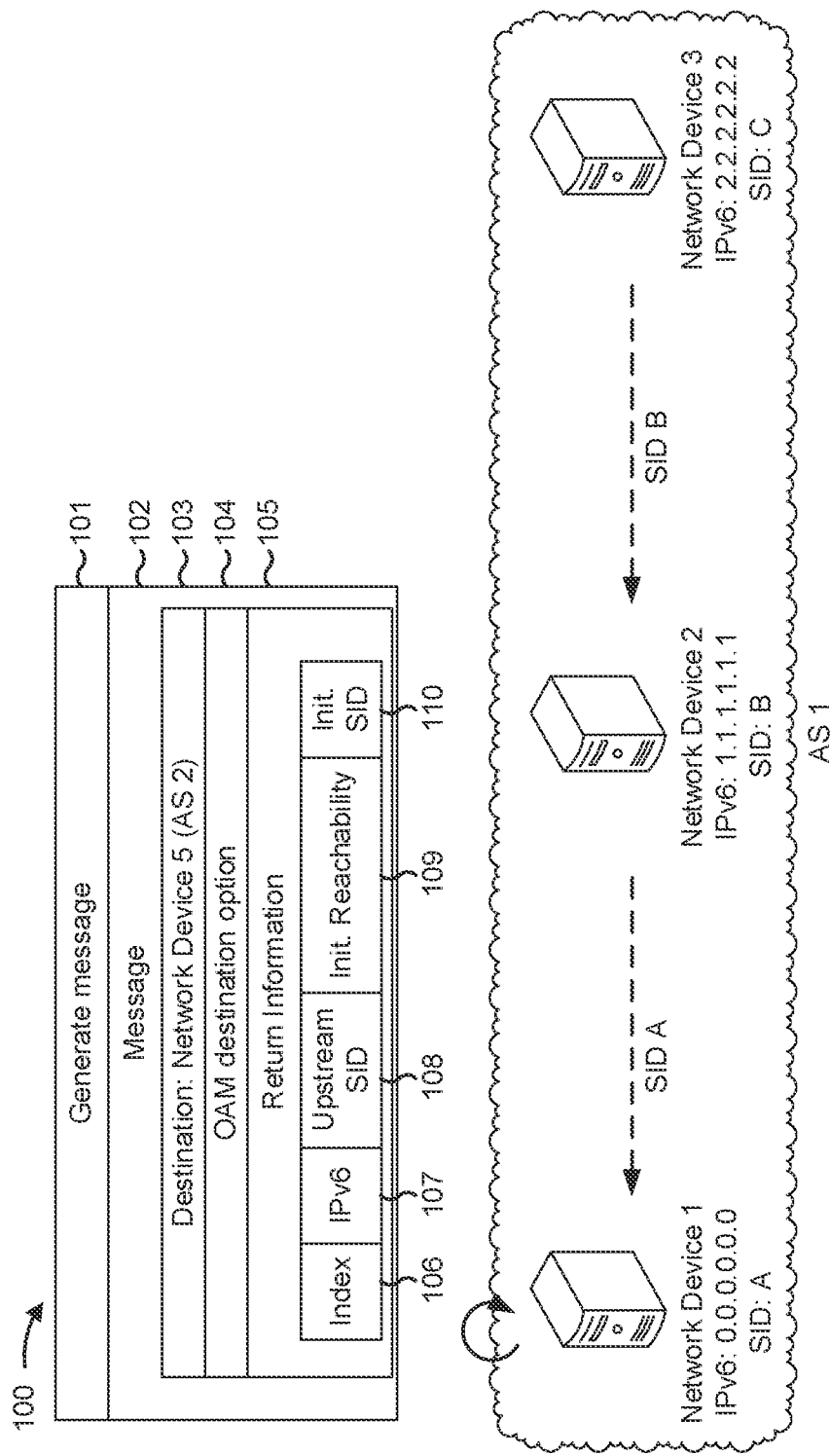
FIGS. 1A-1G are diagrams of an example implementation described herein.

The following detailed description of example implementations refers to the accompanying drawings. The same reference numbers in different drawings may identify the same or similar elements.

A service provider network may route a message from an initial device to a destination device. For example, a controller may use routing information to identify a path from the initial device to the destination device. The message may include information indicating the path, so that network devices of the path can forward the message to appropriate downstream devices until the message reaches the destination device. As an example, in a network that uses segment routing (e.g., Segment Routing v6+ (SRv6+), and/or the like), the message (e.g., a routing header of the message, such as a compressed router header (CRH)) may include a list of segment identifiers (SIDs) indicating a path composed of segments corresponding to network devices or network addresses (e.g., Internet Protocol v6 (IPv6) addresses and/or the like) of network devices along the path. A segment may include a topological path from a first network device to a second network device.

A network device may receive the message and identify a next hop of the path based on a SID identified by the message. The network device, using routing information distributed based on a routing protocol, may add a corresponding network address for the next hop to the message, and may forward the modified message to the next hop. In some implementations, the network device may perform an action based on the message. For example, the message may include a destination option indicating the action.

An AS may include a set of network devices that have access to routing information that is distributed based on a routing protocol. Network devices within an AS may be capable of routing a message to each other in accordance with a SID of the message based on the routing information. When a message is to be provided from a first AS to a second AS, an edge router of the first AS may encapsulate the message with an IPv6 header that includes a CRH, and may provide the packet to an edge router of the second AS. However, in the case of two or more ASs, the second AS may not have consistent reachability to network devices in the first AS, since routing information for the first AS may not be distributed to nodes in the second AS and since the SIDs used for routing may not necessarily be bidirectional (e.g., a SID for a segment from Network Device 1 to Network Device 2 may not be the same as a SID for a segment from Network Device 2 to Network Device 1). Thus, a network device of the second AS may not be able to consistently identify a return path to a network device in the first AS by reference to routing information accessible to the second AS. This may impact the performance or usefulness of a wide variety of messages, such as ping messages, trace route messages, and/or the like.

Some implementations described herein provide determination of a return path of a message as the message traverses a set of network devices of one or more ASs. The return path may be defined by modifying the message as the message is forwarded from network device to network device. For example, each network device may add return information identifying the network device's network address as well as an upstream device identifier that permits routing to a device from which the network device received the message (e.g., an upstream device). A network device may determine the upstream device identifier based on a network address of the upstream device, which the upstream device may have added to the message before forwarding the message to the network device. This may provide for return path determination within an AS and between ASs (e.g., by edge devices of an AS), thereby enabling return path determination across two or more ASs.

Furthermore, implementations described herein provide for reachability information to be added the return information, which may indicate whether each network device on the return path can directly reach an initial device. This may conserve resources of interim network devices on the return path, since any network device with reachability to the initial device can forward the message to the initial device, thereby circumventing the interim network devices. Still further, the determination of the return information may be performed by the network devices on the return path (e.g., by control planes of the network devices based on a destination option included in the message), thereby conserving resources of a controller platform associated with the network devices and reducing latency associated with the message. Thus, inter-AS return path determination by network devices is provided, which may be useful for a wide variety of message types, such as ping messages, trace route messages, and/or the like.

FIGS. 1A-1G are diagrams of an example implementation 100 described herein. As shown, example implementation 100 includes five network devices: Network Device 1, Network Device 2, Network Device 3, Network Device 4, and Network Device 5. Each network device is associated with a respective network address (here, an IPv6 address, though any form of network address may be used) and a respective SID. The SID may identify a segment from a next network device to the network device. For example, the SID may identify segments for a return message on a return path including the network devices, as described below. Network Devices 1, 2, and 3 are associated with a first AS (e.g., AS 1) and Network Devices 4 and 5 are associated with a second AS (e.g., AS 2). SIDs corresponding to segments between devices are shown by dashed arrows between the devices. For example, a segment from Network Device 2 to Network Device 1 is shown in FIG. 1A as SID A.

As shown in FIG. 1A, and by reference number 101, Network Device 1 may generate a message. Thus, Network Device 1 may be referred to herein as an initial device of the message. The message may include any type of message. Example content of the message is shown by reference number 102, though the message may include additional information or may not include at least part of the information shown in FIG. 1.

As shown by reference number 103, the message (e.g., a CRH of the message and/or the like) may indicate a destination of the message. Here, the destination of the message is Network Device 5 in AS 2. For example, the message may include one or more SIDs and/or network addresses indicating a route for the message to reach Network Device 5 (e.g., in a CRH of the packet). In some implementations, the one or more SIDs and/or network addresses may be determined by a controller of Network Device 1.

As shown by reference number 104, the message may include a destination option (shown as an Operations and Management (OAM) destination option). The destination option may indicate that a network device is to provide the message to a control plane of the network device. For example, the control plane may handle the determination of the return information and the modification of the message based on the return information, as described in more detail below. As used herein, a control plane may refer to a routing engine and/or the like. If the destination option is not included in the message, then the network device may process the message using a packet forwarding engine. In some implementations, the message may include a different type of indication than a destination option. For example, the message may include a SID that indicates that the message is to be processed by the control plane and/or the like.

As shown by reference number 105, the message may include return information. The return information may be provided in a data structure, such as an array (e.g., a type-length-value (TLV) array and/or the like). The return information may be modified or added by each network device on the path from Network Device 1 to Network Device 5, as described in more detail below. The return information, once completed, may identify a return path from the destination of the message (e.g., Network Device 5) to the initial device of the message (e.g., Network Device 1). The return information may be associated with (e.g., appended to, part of, may travel with, and/or the like) the message, and may be associated with a corresponding return message.

As shown by reference number 106, the return information may include an index value. Here, the index value shows an abbreviation of the network device associated with each row of the return information for clarity (e.g., ND1 corresponds to Network Device 1 and so on). In some implementations, the index may use integer indexing (e.g., starting at zero, at one, or at a different value) or another type of indexing.

As shown by reference number 107, the return information may indicate a network address. Each network device on the return path may add its own network address to the return information. As shown by reference number 108, the return information may include an upstream segment identifier, such as a SID and/or the like. The SID may identify a segment from a downstream device to an upstream device. For example, if Network Device 2 adds a SID, the SID added by Network Device 2 may identify the segment from Network Device 2 to Network Device 1. In this case, Network Device 2 may determine the SID using routing information and using the network address of Network Device 1 (which Network Device 1 may add to the return information before forwarding the message, as described below)

As shown by reference number 109, the return information may include an indication of whether the initial device (e.g., Network Device 1) is reachable from a network device. This indication may be referred to as an initiator reachability bit. For example, Network Device N may set the initiator reachability bit to 1 if Network Device N has reachability to Network Device 1 (e.g., the initial device). As used herein, a first node is said to have reachability to a second node if the first node can provide a message to the second node using a single segment. In some implementations, reachability may refer to direct reachability. As shown by reference number 110, if the initiator reachability bit is set to a true value, then the return information may indicate the corresponding SID to reach the initial device from the network device associated with the index value. The usage of the initiator reachability bit and the corresponding SID may enable compression of a return message that uses the return information, since the return message can be routed to the initial device from an earliest network device of the return path with reachability to the initial device, thereby circumventing one or more intermediate network devices.

Figure 1B:
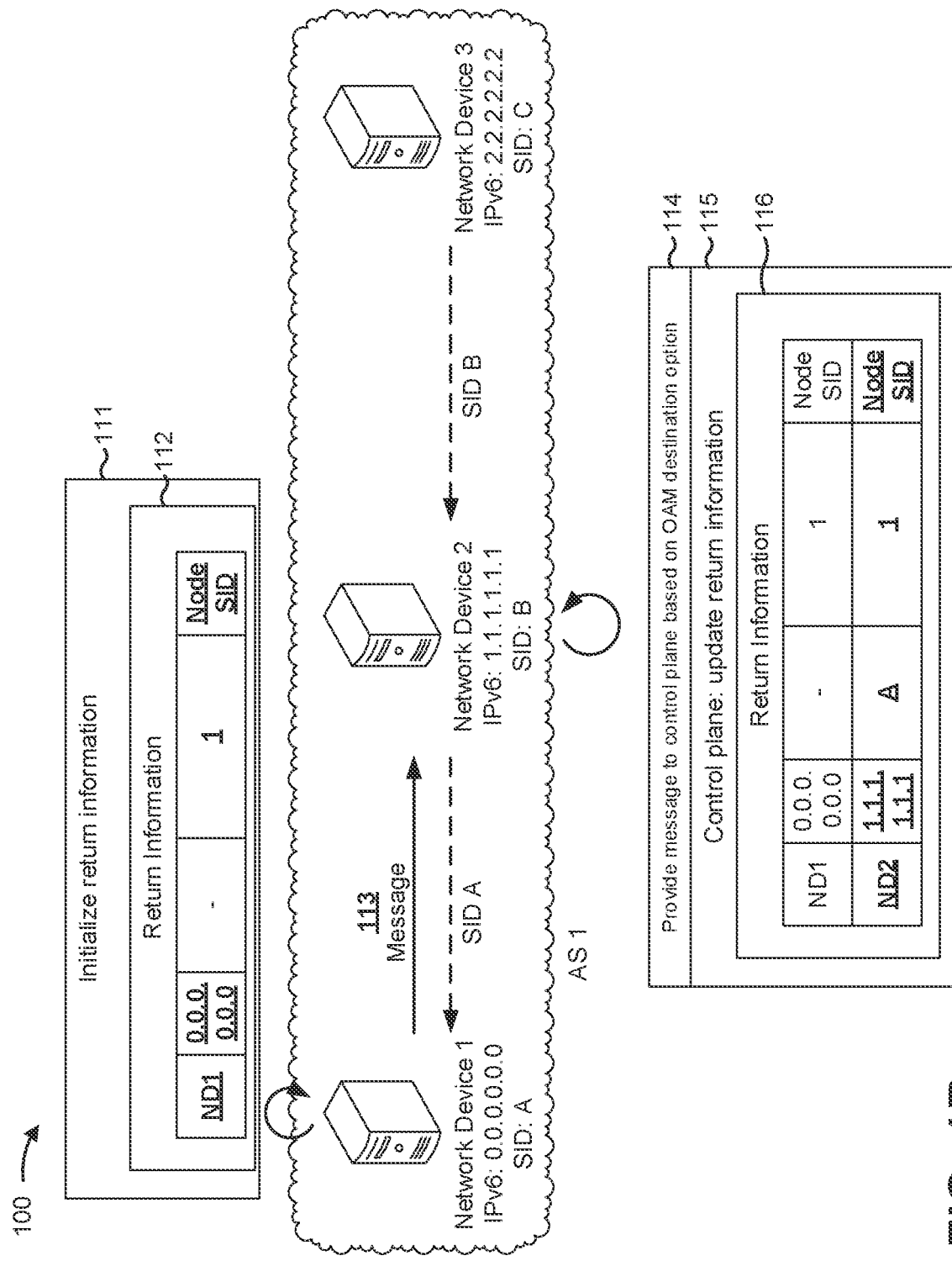

As shown in FIG. 1B, and by reference number 111, Network Device 1 may initialize the return information. The return information as initialized is shown by reference number 112. Additions or modifications of the return information by a network device are indicated by bolded, underlined text in the visual representation of the return information corresponding to the network device. As shown, Network Device 1 may add a first index (e.g., ND1), a network address of Network Device 1 (e.g., an IPv6 address of 0.0.0.0.0.0), an initiator reachability bit value of 1 (e.g., true), and an initiator reachability SID of "Node SID." A Node SID may globally identify a network device to devices associated with routing information for the network device, for example, based on an interior gateway protocol (IGP) and/or the like. Thus, any device with access to routing information that identifies Network Device 1 (e.g., devices of AS 1, such as Network Devices 1, 2, and 3) may have reachability to Network Device 1 using the Node SID associated with Network Device 1.

As shown by reference number 113, Network Device 1 may forward the message to Network Device 2. For example, Network Device 1 may forward the message to a next device identified by the destination information of the message. In some implementations, the message forwarded to the next device of the path may be referred to as a modified message, since the return information of the message has been modified by the upstream device. As used herein, forwarding or transmitting a message may refer to identifying a next hop of the message (e.g., based on a SID associated with the next hop) and adding information identifying the next hop (e.g., the SID associated with the next hop) to a header of the message (e.g., a CRH of the message and/or the like) so that the message is forwarded to the next hop by a packet forwarding engine of the network device.

As shown by reference number 114, Network Device 2 may provide the message to a control plane of Network Device 2 based on the destination option of the message. As shown by reference number 115, the control plane of Network Device 2 may update or modify the return information based on determining that the message includes or is associated with the return information. For example, the control plane may add information relating to Network Device 2 to the return information, as shown by reference number 116. Here, Network Device 2 increments the index (shown as ND2 for clarity) and adds a network address of Network Device 2 (e.g., 1.1.1.1.1.1). Furthermore, Network Device 2 adds an upstream segment identifier of SID A to the return information, indicating a segment from Network Device 2 to Network Device 1. Network Device 2 may identify SID A by reference to routing information using the network address of Network Device 1 (e.g., 0.0.0.0.0.0), which Network Device 1 added to the return information before forwarding the message. Thus, if Network Device 2 receives a return message including the return information, Network Device 2 can identify the next hop as the segment identified by SID A by referring to the index value associated with Network Device 2.

In some implementations, Network Device 2 may add an adjacency SID to the return information. An adjacency SID may be local to Network Device 2 (e.g., may not be globally distributed as routing information) and may identify a next hop that Network Device 2 can use without performing a route lookup. The usage of an adjacency SID may break a loop that would otherwise be caused by a link collapse.

As further shown, Network Device 2 may add an initiator reachability bit value of 1 (e.g., true), and an initiator reachability SID of "Node SID," based on determining that Network Device 2 can reach Network Device 1 using the SID of Node SID.

Figure 1C:
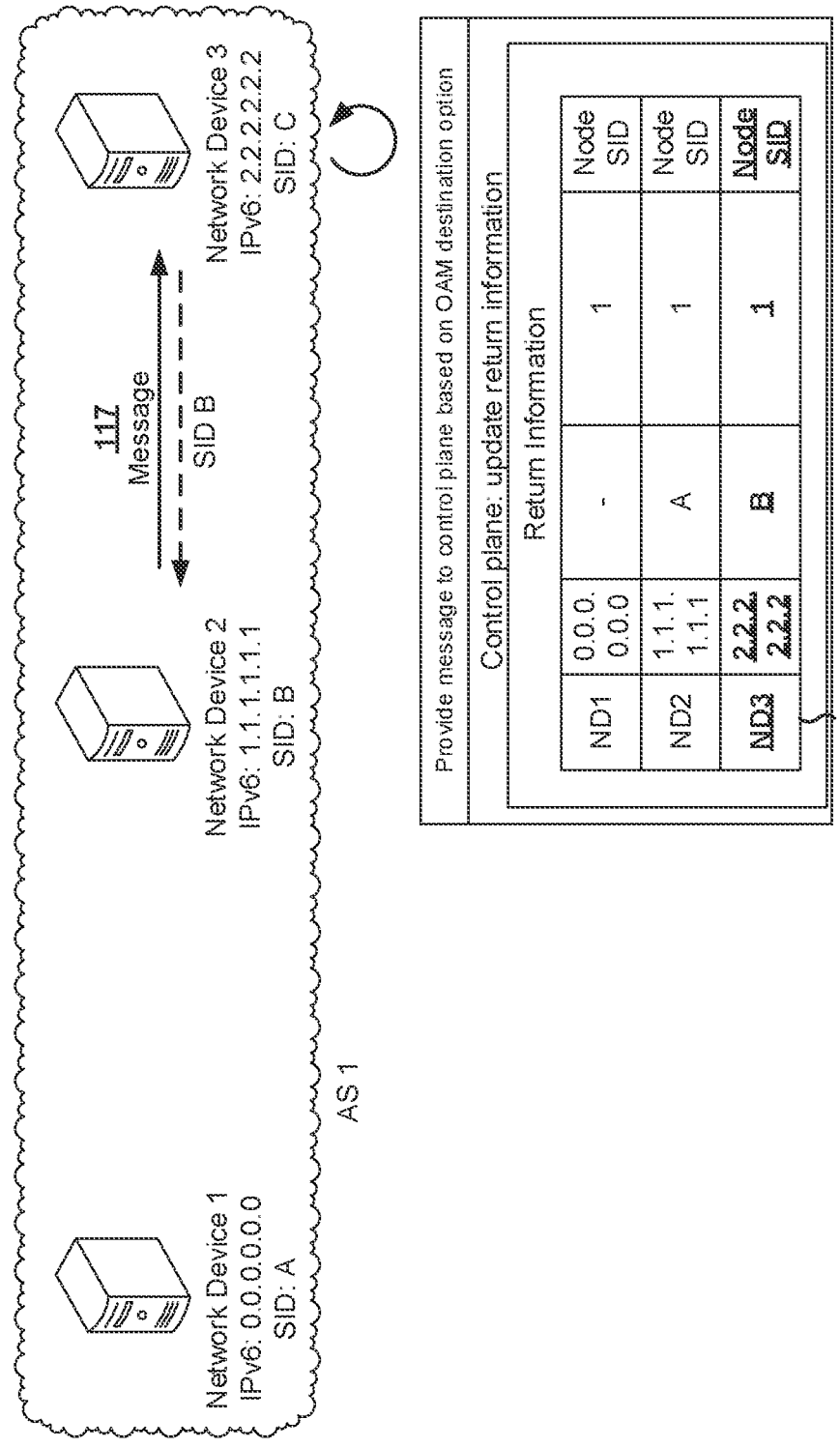

As shown in FIG. 1C, and by reference number 117, Network Device 2 may forward the message (e.g., the modified message) to Network Device 3. As shown, Network Device 3 may provide the message to the control plane based on the destination option, and the control plane may update or modify the return information, as described in more detail in connection with FIG. 1B. For example, as shown by reference number 118, Network Device 3 may increment the index (shown as ND3) and add a network address of Network Device 3 (e.g., 2.2.2.2.2.2). Furthermore, Network Device 3 adds an upstream segment identifier of SID B to the return information, indicating a segment from Network Device 3 to Network Device 2. Network Device 3 may identify SID B by reference to routing information using the network address of Network Device 2 (e.g., 1.1.1.1.1.1), which Network Device 2 added to the return information before forwarding the message. Thus, if Network Device 3 receives a return message including the return information, Network Device 3 can identify the next hop as the segment identified by SID B by referring to the index value associated with Network Device 3. As further shown, Network Device 3 may add an initiator reachability bit value of 1 (e.g., true), and an initiator reachability SID of "Node SID," based on determining that Network Device 3 can reach Network Device 1 using the SID of Node SID.

It should be noted that the data structure described in FIGS. 1A-1G is provided by way of example only. The data structure may have a variety of forms or arrangements. As one example, the SID to reach an upstream network device may be provided in association with the index for the upstream network device rather than in association with the index for the downstream network device that adds the SID to the return information.

Figure 1D:
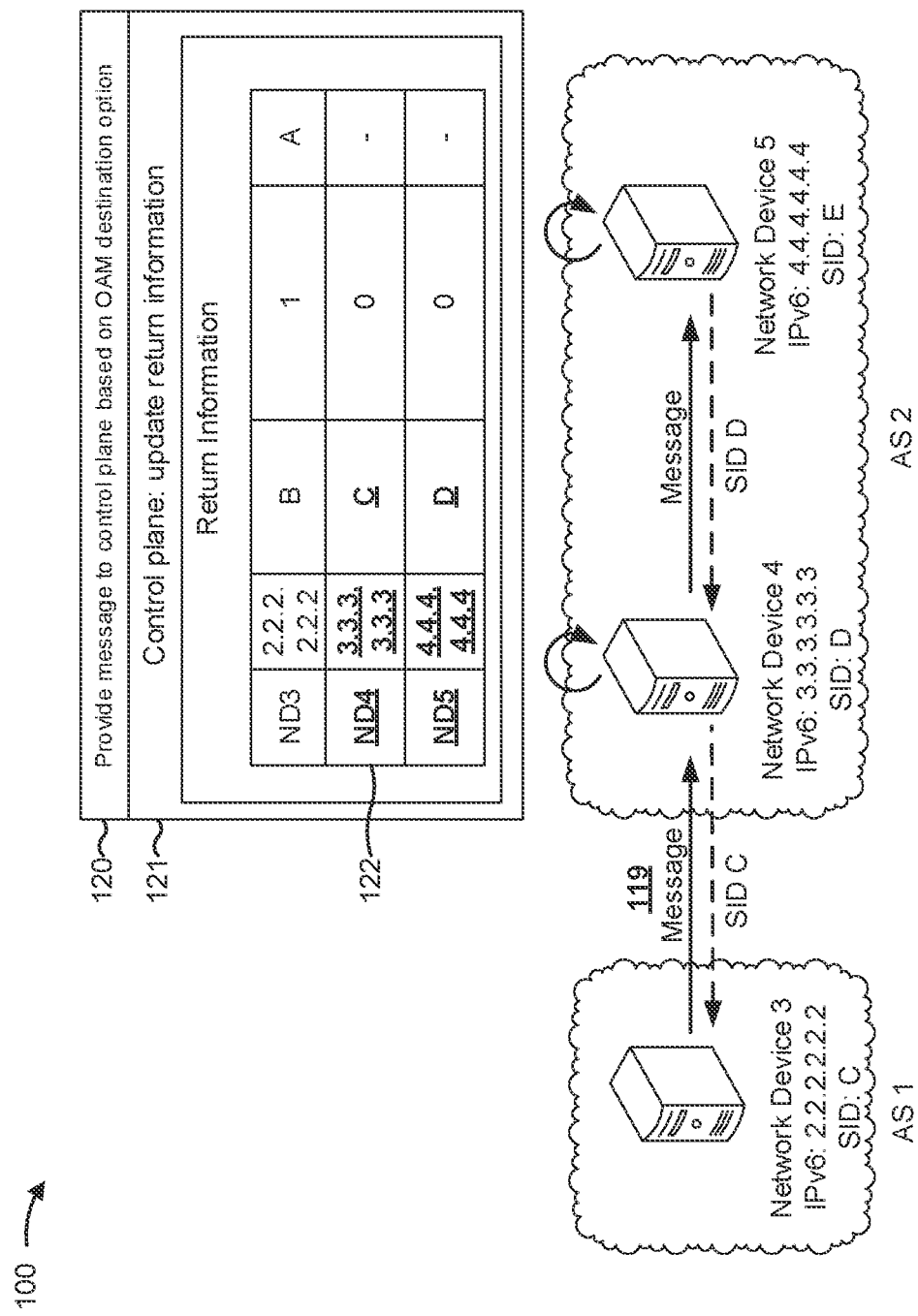

As shown in FIG. 1D, and by reference number 119, Network Device 3 may forward the message (e.g., the modified message) to Network Device 4 of AS 2. For example, Network Device 3 may forward the message based on an exterior gateway protocol, such as the border gateway protocol (BGP) and/or the like. Thus, Network Device 3 and Network Device 4 may be considered edge routers or border routers of AS 1 and AS 2, respectively. Here, AS 2 does not have access to routing information for AS 1, meaning that Network Devices 3 and 4 do not have reachability for the initial device (e.g., Network Device 1).

The operations indicated by reference numbers 120, 121, and 122 relate to both Network Device 4 and Network Device 5, and are represented in a single group of steps for brevity. These operations are performed first by Network Device 4 after receiving the message from Network Device 3, and second by Network Device 5 after receiving the message from Network Device 4. Furthermore, the return information added by Network Device 4 is indicated by the index ND4, and the return information added by Network Device 5 is indicated by the index ND5.

As shown by reference number 120, Network Device 4 may provide the message to a control plane of Network Device 4 based on the destination option. As shown by reference number 121, Network Device 4 may update the return information. For example, as shown by reference number 122, Network Device 4 may increment the index (shown as ND4), may determine and add an upstream segment identifier (e.g., a SID C, a BGP-based value, and/or the like) for a hop to Network Device 3, and may set an initiator reachability bit to zero (e.g., a false value) based on determining that Network Device 4 does not have reachability to Network Device 1. Network Device 4 may forward the message to Network Device 5 (e.g., the destination network device), which may perform similar operations, as shown in FIG. 1D.

Figure 1E:
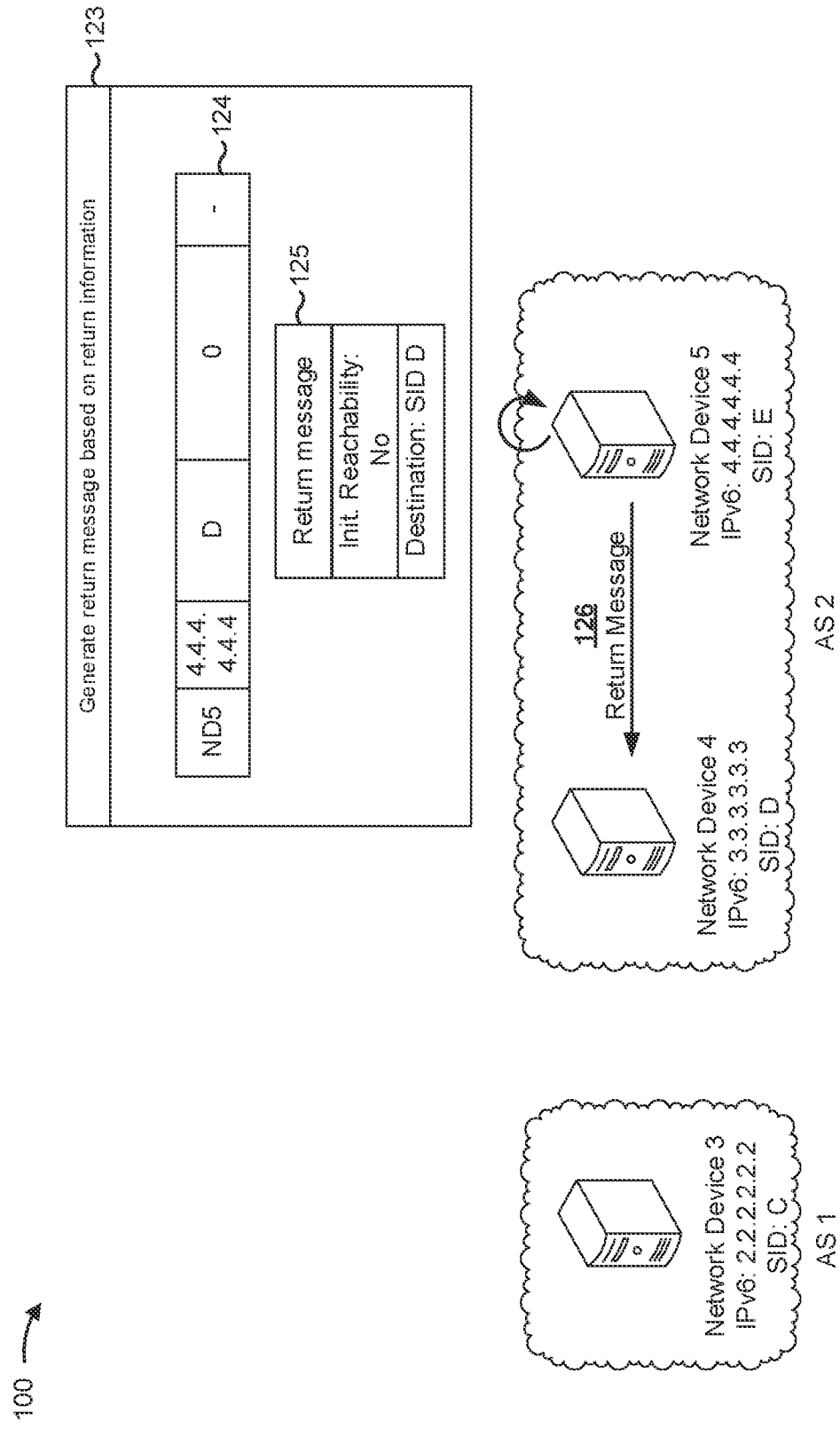

As shown in FIG. 1E, and by reference number 123, Network Device 5 may generate a return message based on the message. For example, if the message includes a ping message, a route trace message, an echo request message, and/or the like, the return message may carry information requested by or generated based on the message. As shown by reference number 124, Network Device 5 may use return information associated with the index corresponding to Network Device 5 to generate the return message. As shown by reference number 125, Network Device 5 may determine that Network Device 5 does not have reachability to Network Device 1 based on the return information, and may accordingly generate the return message using the segment identified by SID D (e.g., the segment from Network Device 5 to Network Device 4) as the destination of the return message. As shown by reference number 126, Network Device 5 may transmit the return message to Network Device 4 via the segment associated with SID D.

Figure 1F:
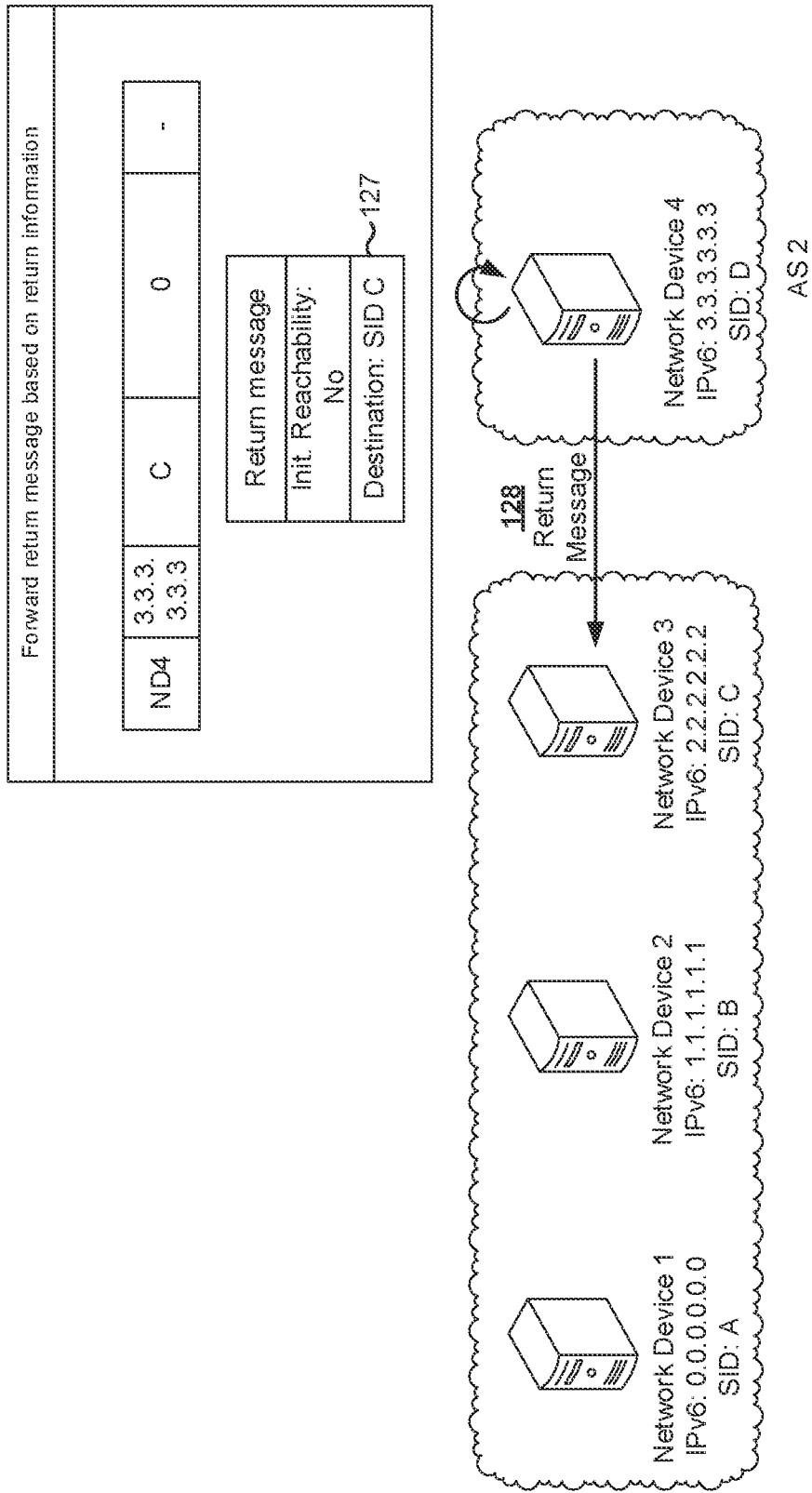

As shown in FIG. 1F, and by reference number 127, Network Device 4 may forward the return message based on the return information associated with Network Device 4. For example, Network Device 4 may identify a segment or upstream device identifier to reach an upstream device (e.g., Network Device 3) based on the initiator reachability bit being set to the false value for Network Device 4, and may forward the return message (shown by reference number 128) on the segment associated with the upstream device identifier.

Figure 1G:
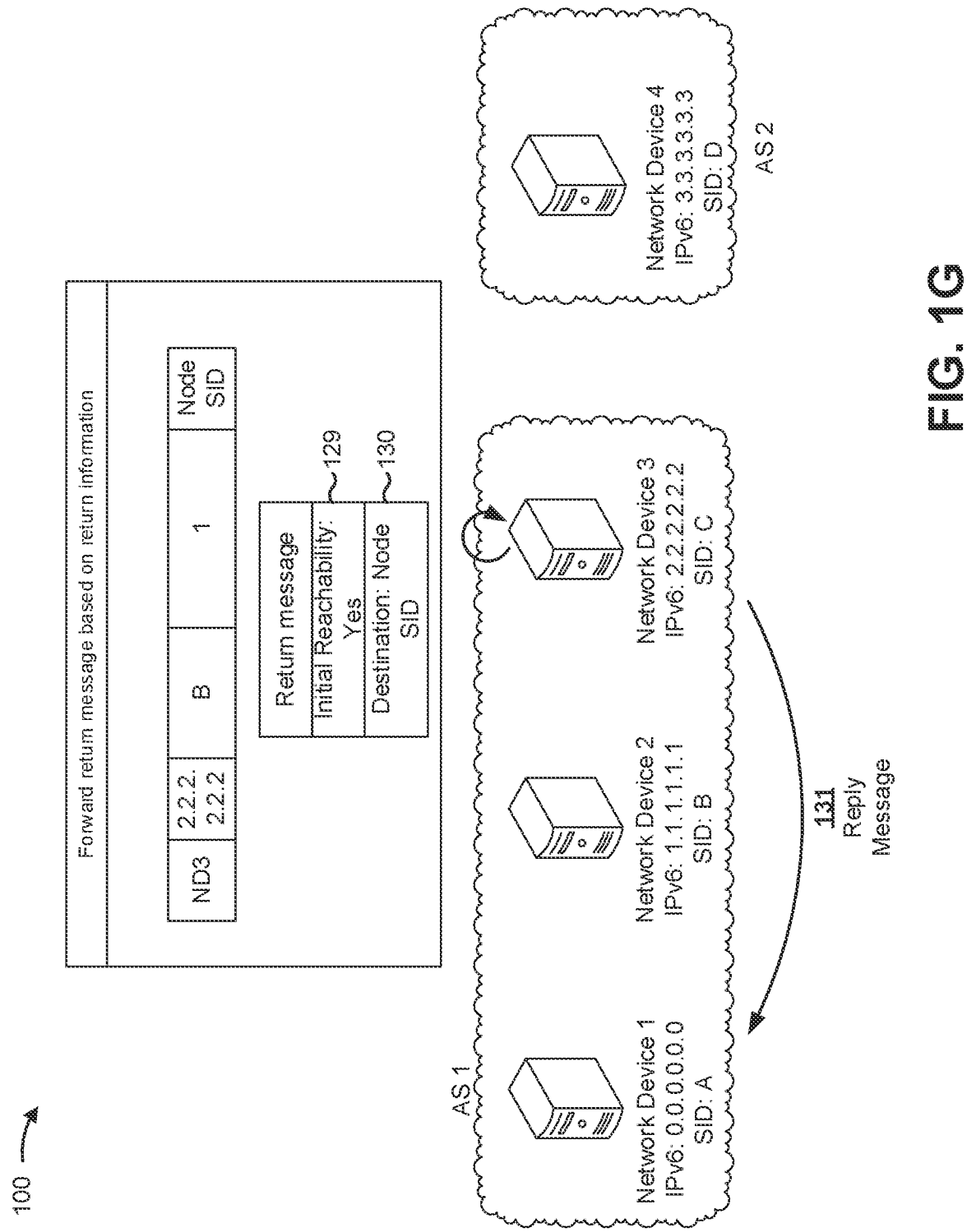

As shown in FIG. 1G, and by reference number 129, Network Device 3 may determine that Network Device 3 can directly reach Network Device 1 based on the initiator reachability bit associated with Network Device 3 being set to the true value. Accordingly, as shown by reference number 130, Network Device 3 may set the destination of the return message to Node SID, corresponding to Network Device 1. In some implementations, Network Device 3 may drop return information associated with one or more intermediate network devices identified by the return information (e.g., Network Device 2) that will not receive the return message based on Network Device 1 being directly reachable by Network Device 3. Thus, Network Device 3 may reduce the size of the return message and conserve resources of Network Device 2 and network link resources. As shown by reference number 131, Network Device 3 may provide the return message directly to Network Device 1 (e.g., on a single segment and/or without providing the return message via Network Device 2).

Thus, network devices on a message's path may generate return information for a corresponding return path of a return message. The generation of the return information by the network devices may reduce latency that would otherwise be incurred by a controller generating the return information. Furthermore, the generation of the return information by the network devices may enable inter-AS return path messaging, thereby simplifying the implementation of certain types of messages (e.g., ping messages, trace route messages, echo requests, and/or the like) with inter-AS paths.

As indicated above, FIGS. 1A-1G are provided merely as one or more examples. Other examples may differ from what is described with regard to FIGS. 1A-1G.

Figure 2:
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a controller platform 220, a network 230, and a group of network devices 240 of network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to controller platform 220, via network 230 and network devices 240. In some implementations, client device 210 may receive network traffic from and/or may provide network traffic to other client devices 210 via network 230 (e.g., by routing packets using network devices 240 as intermediaries).

Controller platform 220 includes one or more devices that determine and distribute routing information, routing paths, and/or the like. In some implementations, controller platform 220 may be designed to be modular such that certain software components may be swapped in or out depending on a particular need. As such, controller platform 220 may be easily and/or quickly reconfigured for different uses. In some implementations, controller platform 220 may receive information from and/or transmit information to one or more client devices 210 and/or network devices 240. In some implementations, controller platform 220 may be referred to as a controller.

In some implementations, as shown, controller platform 220 may be hosted in a cloud computing environment 222. Notably, while implementations described herein describe controller platform 220 as being hosted in cloud computing environment 222, in some implementations, controller platform 220 may not be cloud-based (i.e., may be implemented outside of a cloud computing environment) or may be partially cloud-based.

Cloud computing environment 222 includes an environment that hosts controller platform 220. Cloud computing environment 222 may provide computation, software, data access, storage, etc., services that do not require end-user knowledge of a physical location and configuration of system(s) and/or device(s) that hosts controller platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host controller platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210 and/or network devices 240. For example, application 224-1 may include software associated with controller platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of controller platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, an AS, and/or the like, and/or a combination of these or other types of networks.

Network device 240 includes one or more devices capable of receiving, processing, storing, routing, and/or providing traffic (e.g., a packet, a message, a reply message, reply information, other information or metadata, and/or the like) in a manner described herein. For example, network device 240 may include a router, such as a label switching router (LSR), a label edge router (LER), an ingress router, an egress router, a border router, a provider router (e.g., a provider edge router, a provider core router, etc.), a virtual router, and/or the like. Additionally, or alternatively, network device 240 may include a gateway, a switch, a firewall, a hub, a bridge, a reverse proxy, a server (e.g., a proxy server, a cloud server, a data center server, etc.), a load balancer, and/or a similar device. Network device 240 may be referred to herein as a node. In some implementations, network device 240 may be a physical device implemented within a housing, such as a chassis. In some implementations, network device 240 may be a virtual device implemented by one or more computer devices of a cloud computing environment or a data center.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
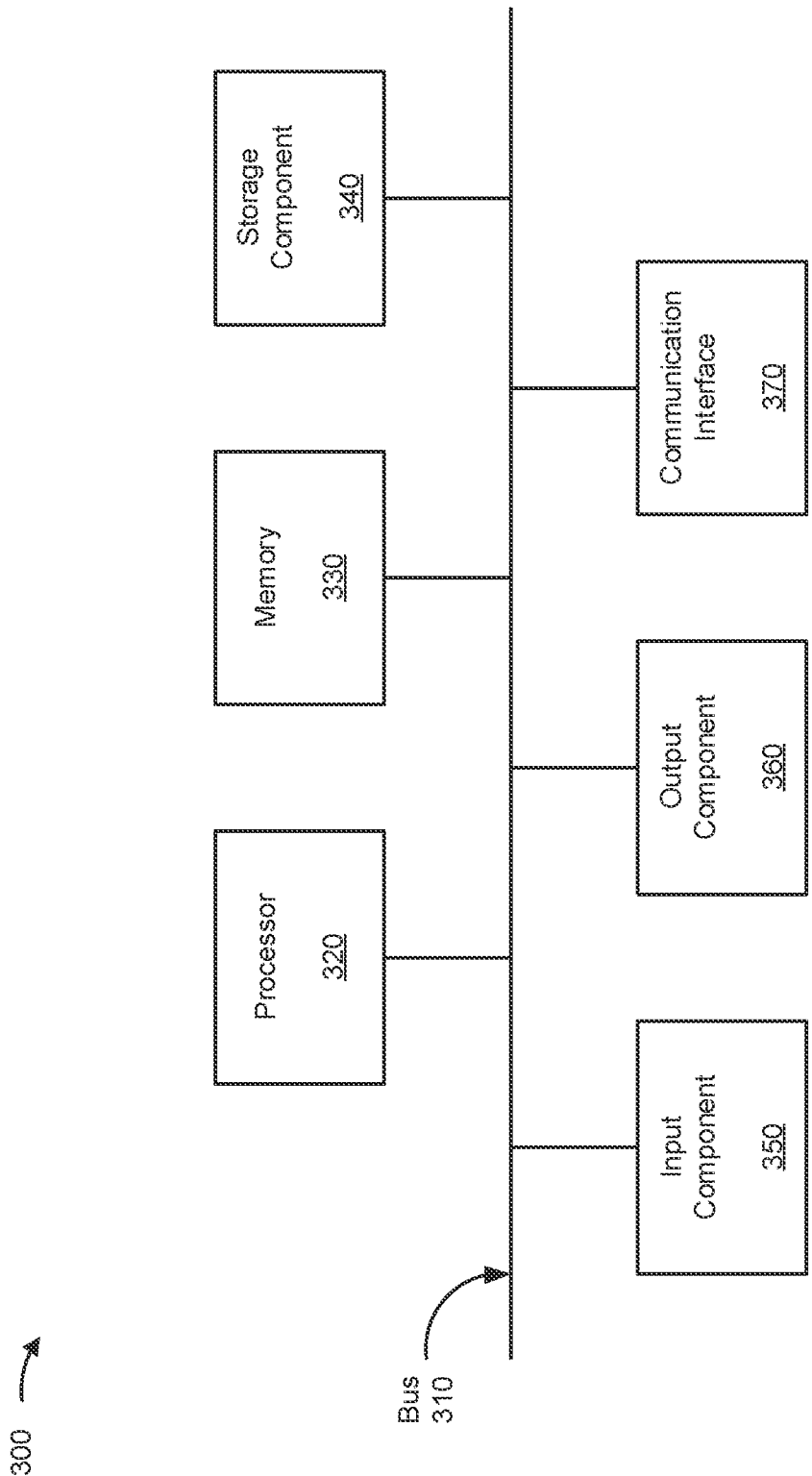
FIG. 3 is a diagram of example components of one or more devices of FIG. 2.

FIG. 3 is a diagram of example components of a device 300. Device 300 may correspond to client device 210, controller platform 220, computing resource 224, and/or network device 240. In some implementations, client device 210, controller platform 220, computing resource 224, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

FIG. 4 is a flow chart of an example process 400 for inter-autonomous system trace route messaging. In some implementations, one or more process blocks of FIG. 4 may be performed by a network device (e.g., Network Devices 1-5 of FIGS. 1A-1G, network device 240, and/or the like). In some implementations, one or more process blocks of FIG. 4 may be performed by another device or a group of devices separate from or including the network device, such as client device 210, controller platform 220, and/or the like.

As shown in FIG. 4, process 400 may include receiving a message (block 410). For example, the network device (e.g., using processor 320, communication interface 370 and/or the like) may receive a message, as described above.

As further shown in FIG. 4, process 400 may include determining that the message includes return information indicating a path to an initial device that generated the message (block 420). For example, the network device (e.g., using processor 320 and/or the like) may determine that the message includes return information indicating a path (e.g., a return path) to an initial device that generated the message, as described above.

As further shown in FIG. 4, process 400 may include modifying the message by adding an upstream device identifier, wherein the upstream device identifier identifies a device from which the message is received (block 430). For example, the network device (e.g., using processor 320, communication interface 370 and/or the like) may modify the message by adding an upstream device identifier, as described above. In some implementations, the upstream device identifier identifies a device from which the message is received.

As further shown in FIG. 4, process 400 may include modifying the message by adding an indication of whether the initial device is reachable by the network device using a segment identifier (block 440). For example, the network device (e.g., using processor 320, input component 350, output component 360, communication interface 370 and/or the like) may modify the message by adding an indication of whether the initial device is reachable by the network device using a segment identifier, as described above.

As further shown in FIG. 4, process 400 may include providing the modified message to a downstream device (block 450). For example, the network device (e.g., using processor 320, communication interface 370 and/or the like) may provide the modified message to a downstream device, as described above.

Process 400 may include additional implementations, such as any single implementation or any combination of implementations described below and/or in connection with one or more other processes described elsewhere herein.

In a first implementation, process 400 includes receiving a return message including the return information; and forwarding the return message to the device from which the message is received based on the upstream device identifier.

In a second implementation, alone or in combination with the first implementation, process 400 includes determining, based on the indication and prior to forwarding the return message, that the initial device is not reachable using the segment identifier, wherein is forwarding the return message to the device from which the message is received is based on determining that the initial device is not reachable using the segment identifier.

In a third implementation, alone or in combination with one or more of the first and second implementations, process 400 includes receiving a return message including the return information; and determining, based on the indication, that the initial device is reachable by the network device using the segment identifier; and forwarding the return message to the initial device using the segment identifier based on the initial device being reachable by the network device using the segment identifier.

In a fourth implementation, alone or in combination with one or more of the first through third implementations, process 400 includes determining a segment identifier associated with a network address of the device from which the message is received, wherein the upstream device identifier includes the segment identifier.

In a fifth implementation, alone or in combination with one or more of the first through fourth implementations, process 400 includes modifying the message by adding, to the message, a network address of the network device.

In a sixth implementation, alone or in combination with one or more of the first through fifth implementation, when the initial device is reachable by the network device using the segment identifier, the method further comprises: modifying the message by adding the segment identifier to the message.

In a seventh implementation, alone or in combination with one or more of the first through sixth implementations, the network device is associated with a first autonomous system and the initial device is associated with a second autonomous system different than the first autonomous system.

In an eighth implementation, alone or in combination with one or more of the first through seventh implementations, the network device is associated with a first autonomous system and the downstream device is associated with a second autonomous system different than the first autonomous system.

In a ninth implementation, alone or in combination with one or more of the first through eighth implementations, the determination is performed by a control plane of the network device.

In a tenth implementation, alone or in combination with one or more of the first through ninth implementations, the control plane performs the determination based on a destination option included in the message.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for inter-autonomous system trace route messaging. In some implementations, one or more process blocks of FIG. 5 may be performed by a network device (e.g., Network Devices 1-5 of FIGS. 1A-1G, network device 240, and/or the like). In some implementations, one or more process blocks of FIG. 5 may be performed by another device or a group of devices separate from or including the network device, such as client device 210, controller platform 220, and/or the like.

As shown in FIG. 5, process 500 may include determining that a message includes return information indicating a path to an initial device that generated the message (block 510). For example, the network device (e.g., using processor 320 and/or the like) may determine that a message includes return information indicating a path (e.g., a return path) to an initial device that generated the message, as described above.

As further shown in FIG. 5, process 500 may include modifying the message by adding, to the return information, an upstream device identifier, wherein the upstream device identifier identifies a device from which the message is received (block 520). For example, the network device (e.g., using processor 320, communication interface 370 and/or the like) may modify the message by adding, to the return information, an upstream device identifier, as described above. In some implementations, the upstream device identifier identifies a device from which the message is received.

As further shown in FIG. 5, process 500 may include modifying the message by adding, to the return information, an indication of whether the initial device is reachable by the network device using a segment identifier (block 530). For example, the network device (e.g., using processor 320, communication interface 370, and/or the like) may modify the message by adding, to the return information, an indication of whether the initial device is reachable by the network device using a segment identifier, as described above.

As further shown in FIG. 5, process 500 may include providing the modified message to a downstream device (block 540). For example, the network device (e.g., using processor 320, communication interface 370, and/or the like) may provide the modified message to a downstream device, as described above.

As further shown in FIG. 5, process 500 may include receiving a return message including the return information (block 550). For example, the network device (e.g., using processor 320, communication interface 370 and/or the like) may receive a return message including the return information, as described above.

As further shown in FIG. 5, process 500 may include selectively forwarding the return message to the device from which the message is received, or to the initial device, based on the indication of whether the initial device is reachable by the network device using the segment identifier (block 560). For example, the network device (e.g., using processor 320, communication interface 370, and/or the like) may selectively forward the return message to the device from which the message is received, or to the initial device, based on the indication of whether the initial device is reachable by the network device using the segment identifier, as described above.

Process 500 may include additional implementations, such as any single implementation or any combination of implementations described below and/or in connection with one or more other processes described elsewhere herein.

In a first implementation, process 500 includes removing at least part of the return information based on forwarding the return message to the initial device.

In a second implementation, alone or in combination with the first implementation, the at least part of the return information includes the upstream device identifier.

In a third implementation, alone or in combination with one or more of the first and second implementations, the message comprises at least one of a ping message or a trace route message.

In a fourth implementation, alone or in combination with one or more of the first through third implementations, the upstream device identifier and the indication are determined by the network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for inter-autonomous system trace route message. In some implementations, one or more process blocks of FIG. 6 may be performed by a network device (e.g., Network Devices 1-5 of FIGS. 1A-1G, network device 240, and/or the like). In some implementations, one or more process blocks of FIG. 6 may be performed by another device or a group of devices separate from or including the network device, such as client device 210, controller platform 220, and/or the like.

As shown in FIG. 6, process 600 may include determining that a message includes return information indicating a path to an initial device that generated the message (block 610). For example, the network device (e.g., using processor 320, and/or the like) may determine that a message includes return information indicating a path to an initial device that generated the message, as described above.

As further shown in FIG. 6, process 600 may include adding, to the return information, an upstream device identifier, wherein the upstream device identifier identifies a device from which the message is received (block 620). For example, the network device (e.g., using processor 320, communication interface 370 and/or the like) may add, to the return information, an upstream device identifier, as described above. In some implementations, the upstream device identifier identifies a device from which the message is received.

As further shown in FIG. 6, process 600 may include adding, to the return information, an indication of whether the initial device is reachable by the network device using a segment identifier associated with the initial device (block 630). For example, the network device (e.g., using processor 320, communication interface 370, and/or the like) may add, to the return information, an indication of whether the initial device is reachable by the network device using a segment identifier associated with the initial device, as described above.

As further shown in FIG. 6, process 600 may include receiving or generating a return message including the return information (block 640). For example, the network device (e.g., using processor 320, communication interface 370, and/or the like) may receive or generate a return message including the return information, as described above.

As further shown in FIG. 6, process 600 may include selectively forwarding the return message to the device from which the message is received, or to the initial device, based on the indication of whether the initial device is reachable by the network device using the segment identifier (block 650). For example, the network device (e.g., using processor 320, communication interface 370, and/or the like) may selectively forward the return message to the device from which the message is received, or to the initial device, based on the indication of whether the initial device is reachable by the network device using the segment identifier, as described above.

Process 600 may include additional implementations, such as any single implementation or any combination of implementations described below and/or in connection with one or more other processes described elsewhere herein.

In a first implementation, the network device is a destination device of the message.

In a second implementation, alone or in combination with the first implementation, process 600 includes determining the upstream device identifier based on routing information and based on a network address of the device from which the message is received, wherein the network address is being included in the return information.

In a third implementation, alone or in combination with one or more of the first and second implementations, the segment identifier associated with the initial device and the upstream device identifier comprise Segment Routing over Internet Protocol v6 segment identifiers.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   determining, by a first device, that a message received from an upstream device includes first information indicating a path to a second device that generated the message;
   modifying, by the first device, the message,
      wherein the modifying comprises adding an indication of whether the second device is reachable by the first device, and
         wherein the indication is based on a segment identifier;
   providing, by the first device, the modified message to a downstream device; and
   forwarding, by the first device, based on providing the modified message to the downstream device, and based on the indication, a return message,
      wherein forwarding the return message comprises:
         forwarding the return message to the upstream device based on determining that the second device is not reachable,
            wherein the determination is made based on the indication, or
         forwarding the return message to the second device based on determining that the second device is reachable,
            wherein the determination is made based on the indication.

2. The method of claim 1, further comprising:
   removing a portion of the return message based on forwarding the return message.

3. The method of claim 1, wherein the modified message comprises a corresponding segment identifier to reach the second device from a network device associated with an index value of the modified message.

4. The method of claim 1, wherein the segment identifier identifies a segment from the downstream device to the upstream device.

5. The method of claim 1, wherein information related to the first device is added to the modified message by a control plane of a network associated with the first device.

6. The method of claim 1, further comprising:
   removing, from the return message, information associated with one or more intermediate network devices identified as not receiving the return messaged based on the indication.

7. The method of claim 1, wherein the first device is associated with a first autonomous system and the downstream device is associated with a second autonomous system different than the first autonomous system.

8. A first device, comprising:
   one or more memories; and
   one or more processors to:
      determine that a message received from an upstream device includes first information indicating a path to a second device that generated the message;
      modify the message by adding an indication of whether the second device is reachable by the first device,
         wherein the indication is based on a segment identifier;
      provide the modified message to a downstream device;
      receive or generate a return message that includes the indication; and
      forward, based on the indication, the return message,
         wherein forwarding the return message comprises:
            forwarding the return message to the upstream device based on determining that the second device is not reachable,
               wherein the determination is made based on the indication, or
            forwarding the return message to the second device based on determining that the second device is reachable,
               wherein the determination is made based on the indication.

9. The first device of claim 8, wherein the one or more processors, to forward the return message, are further to:
   remove a portion of the return message based on forwarding the return message.

10. The first device of claim 8, wherein the modified message comprises a corresponding segment identifier to reach the second device from a network device associated with an index value of the modified message.

11. The first device of claim 8, wherein the segment identifier identifies a segment from the downstream device to the upstream device.

12. The first device of claim 8, wherein information related to the first device is added to the modified message by a control plane of a network associated with the first device.

13. The first device of claim 8, wherein the one or more processors are further to:
   remove, from the return message, information associated with one or more intermediate network devices identified as not receiving the return messaged based on the indication.

14. The first device of claim 8, wherein the first device is associated with a first autonomous system and the downstream device is associated with a second autonomous system different than the first autonomous system.

15. A non-transitory computer-readable medium storing a set of instructions, the set of instructions comprising:
   one or more instructions that, when executed by one or more processors of a first device, cause the first device to:
      determine that a message received from an upstream device includes first information indicating a path to a second device that generated the message;
      modify the message by adding an indication of whether the second device is reachable by the first device,
         wherein the indication is based on a segment identifier;
      provide the modified message to a downstream device;
      receive or generate a return message that includes the indication; and
      selectively, based on the indication, forward the return message to the second device or the upstream device.

16. The non-transitory computer-readable medium of claim 15, wherein the one or more instructions, that cause the first device to forward the return message, cause the first device to:
   remove a portion of the return message based on forwarding the return message.

17. The non-transitory computer-readable medium of claim 15, wherein the modified message comprises:

a corresponding segment identifier to reach the second device from a network device associated with an index value of the modified message.

18. The non-transitory computer-readable medium of claim 15, wherein the segment identifier identifies a segment from the downstream device to the upstream device.

19. The non-transitory computer-readable medium of claim 15, wherein information related to the first device is added to the modified message by a control plane of a network associated with the first device.

20. The non-transitory computer-readable medium of claim 15, wherein the one or more instructions further cause the first device to:

remove, from the return message, information associated with one or more intermediate network devices identified as not receiving the return messaged based on the indication.

\* \* \* \* \*